United States Patent
Harada

(10) Patent No.: US 10,893,153 B2
(45) Date of Patent: Jan. 12, 2021

(54) INFORMATION PROCESSING APPARATUS THAT PERFORMS ALBUM CREATION PROCESS AND METHOD FOR CONTROLLING INFORMATION PROCESSING APPARATUS THAT PERFORMS ALBUM CREATION PROCESS

(71) Applicant: KYOCERA Document Solutions Inc., Osaka (JP)

(72) Inventor: Takashi Harada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/665,635

(22) Filed: Oct. 28, 2019

(65) Prior Publication Data

US 2020/0137237 A1    Apr. 30, 2020

(30) Foreign Application Priority Data

Oct. 31, 2018 (JP) .................. 2018-204944

(51) Int. Cl.
*H04N 1/00* (2006.01)

(52) U.S. Cl.
CPC ..... *H04N 1/00167* (2013.01); *H04N 1/00183* (2013.01); *H04N 1/00188* (2013.01); *H04N 1/00196* (2013.01)

(58) Field of Classification Search
CPC ................................. H04N 1/00167
See application file for complete search history.

(56) References Cited

U.S. PATENT DOCUMENTS

| 6,324,521 | B1 | 11/2001 | Shiota et al. ............ 705/27 |
| 7,679,760 | B2 * | 3/2010 | Inoue .............. G06F 21/608 358/1.14 |
| 2002/0013742 | A1 | 1/2002 | Shiota et al. ............ 705/26 |
| 2008/0007783 | A1 * | 1/2008 | Terada ............ H04N 1/00198 358/1.18 |
| 2009/0043675 | A1 | 2/2009 | Shiota et al. ............ 705/27 |
| 2010/0073396 | A1 * | 3/2010 | Wang .............. H04N 1/00461 345/591 |
| 2012/0020648 | A1 * | 1/2012 | Yamaji ............ G11B 27/034 386/278 |
| 2017/0034324 | A1 * | 2/2017 | Zhang ............ H04M 1/27475 |

FOREIGN PATENT DOCUMENTS

JP    2007-287161 A    11/2007

* cited by examiner

*Primary Examiner* — Jacky X Zheng
(74) *Attorney, Agent, or Firm* — Stein IP, LLC

(57) ABSTRACT

An information processing apparatus includes a storage medium, an input device, and a processor. The storage medium stores photograph data and comments. The processor generates album page data in which selected pieces of photograph data are placed. The processor adds an enclosure image and one of the comments to each of the pieces of photograph data.

9 Claims, 7 Drawing Sheets

FIG.4

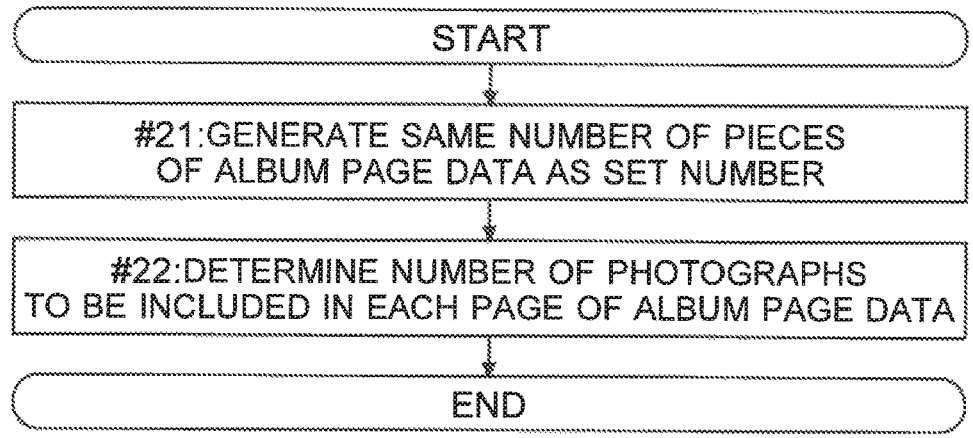

START
↓
21: GENERATE SAME NUMBER OF PIECES OF ALBUM PAGE DATA AS SET NUMBER
↓
22: DETERMINE NUMBER OF PHOTOGRAPHS TO BE INCLUDED IN EACH PAGE OF ALBUM PAGE DATA
↓
END

FIG.5

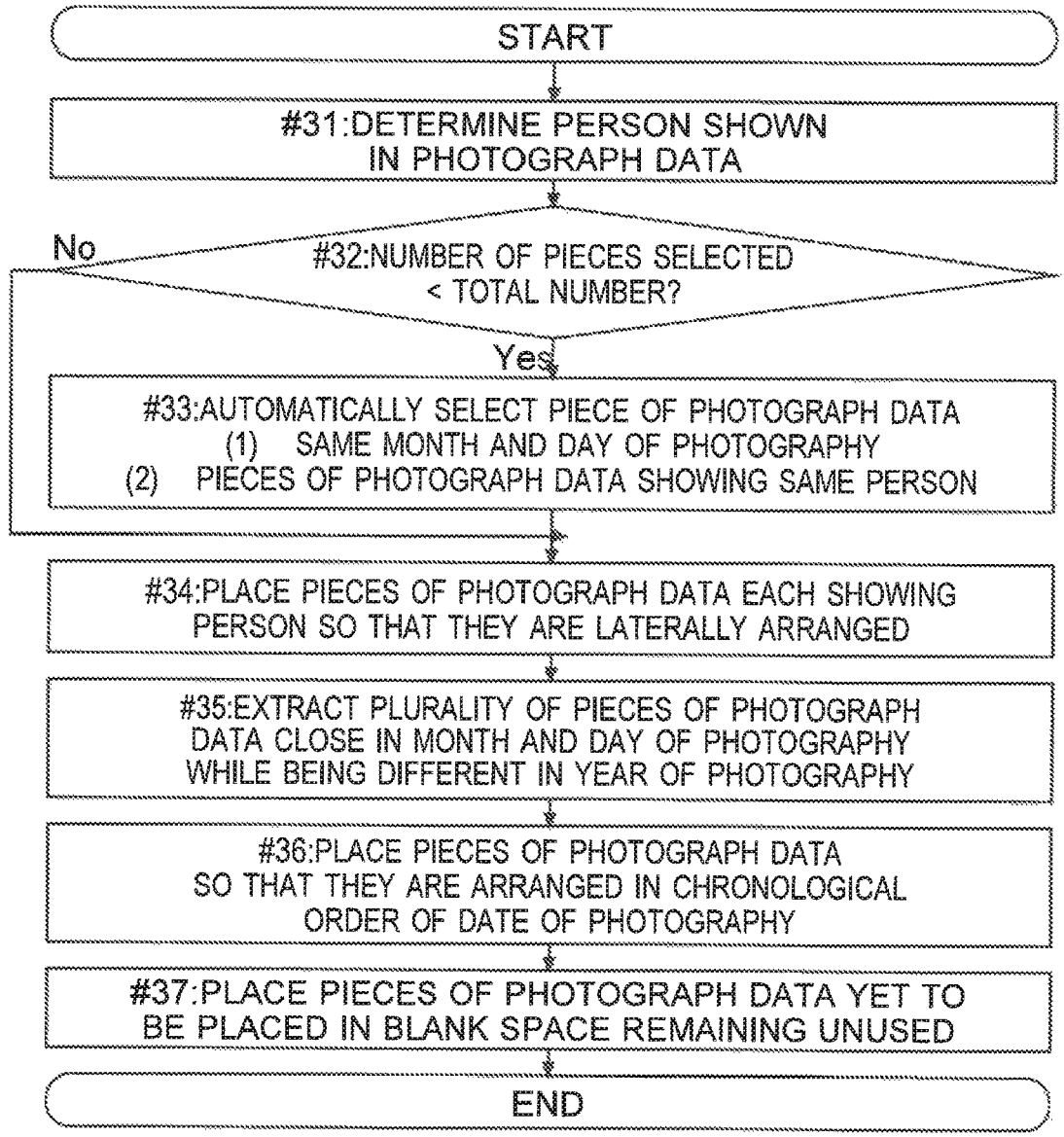

START
↓
31: DETERMINE PERSON SHOWN IN PHOTOGRAPH DATA
↓
32: NUMBER OF PIECES SELECTED < TOTAL NUMBER?
— No → (loop back)
— Yes ↓
33: AUTOMATICALLY SELECT PIECE OF PHOTOGRAPH DATA
 (1) SAME MONTH AND DAY OF PHOTOGRAPHY
 (2) PIECES OF PHOTOGRAPH DATA SHOWING SAME PERSON
↓
34: PLACE PIECES OF PHOTOGRAPH DATA EACH SHOWING PERSON SO THAT THEY ARE LATERALLY ARRANGED
↓
35: EXTRACT PLURALITY OF PIECES OF PHOTOGRAPH DATA CLOSE IN MONTH AND DAY OF PHOTOGRAPHY WHILE BEING DIFFERENT IN YEAR OF PHOTOGRAPHY
↓
36: PLACE PIECES OF PHOTOGRAPH DATA SO THAT THEY ARE ARRANGED IN CHRONOLOGICAL ORDER OF DATE OF PHOTOGRAPHY
↓
37: PLACE PIECES OF PHOTOGRAPH DATA YET TO BE PLACED IN BLANK SPACE REMAINING UNUSED
↓
END

FIG.8

| AGE GROUP | COMMENT | REPLY COMMENT |
|---|---|---|
| INFANT | I Want That | You Can Take It |
| | I Wanna Eat That! | Go Ahead |
| | ⋮ | ⋮ |
| CHILD | I Am Taking That | Go for It! |
| | I Did Great | Well Done |
| | ⋮ | ⋮ |
| ADULT | Hello! | Hello!! |
| | Mmm…Good!! | So Good!! |
| | ⋮ | ⋮ |
| ELDERLY | I Am Tired! | Hang in There! |
| | Heave-ho, Heave-ho | — |
| | ⋮ | ⋮ |
| EVENT | Wedding Anniversary | |
| | Birthday | |
| | ⋮ | |
| FACIAL EXPRESSION | Ouch! | |
| | Hahahahahahahaha | |
| | ⋮ | |

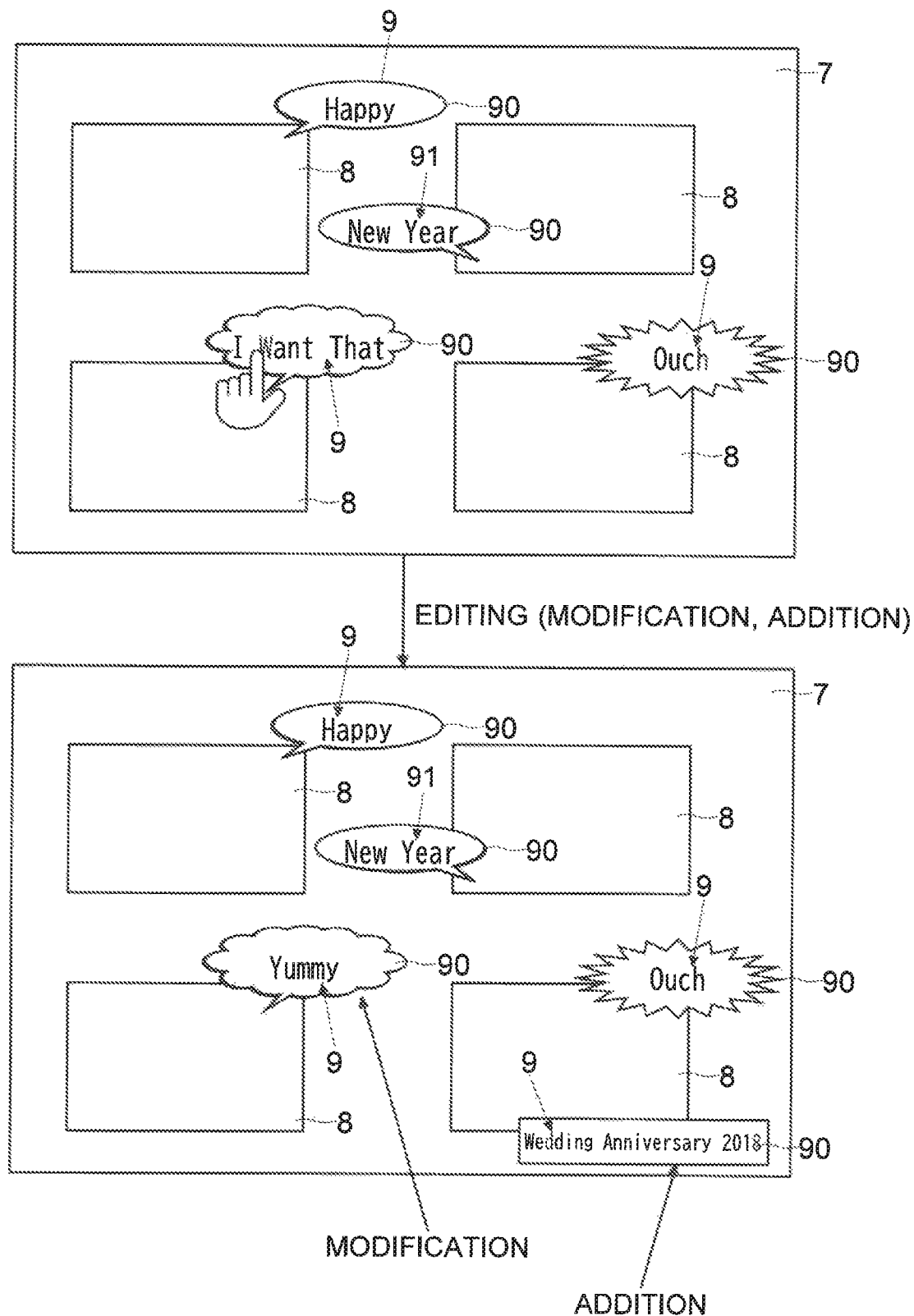

INFORMATION PROCESSING APPARATUS THAT PERFORMS ALBUM CREATION PROCESS AND METHOD FOR CONTROLLING INFORMATION PROCESSING APPARATUS THAT PERFORMS ALBUM CREATION PROCESS

INCORPORATION BY REFERENCE

This application is based upon and claims the benefit of priority from the corresponding Japanese Patent Application No. 2018-204944 filed on Oct. 31, 2018, the contents of which are incorporated herein by reference.

BACKGROUND

The present disclosure relates to an information processing apparatus that performs an album creation process.

For example, a camera is used to photograph a family or an event. In recent years, a digital camera or a smartphone equipped with a camera function is often used as a camera. Image data obtained by such a camera is printed. There is known a technique, as described below, for printing photographic image data by use of a network.

Specifically, a print ordering method has been disclosed in which a computer accesses a server via a network, the server storing image data and template image data (a background image), accepts a client's input of a process of processing the image data and the template image data and his/her input of an order for a print service regarding image data obtained by the processing process, generates order information, and transmits the order information to the server. The order information includes contents of the order for the print service regarding the image data. The order information also includes a processing process step of inserting the image data into a blank region in the template image data.

Photographic image data may be saved in an information processing apparatus. For example, photographic image data is transferred from a camera to an information processing apparatus (capturing of photograph data). Further, it may be desired to create an album by using the photographic image data saved in the information processing apparatus. For example, it may be desired to create an album for a child. In this case, image data of a plurality of photographs is pasted on each page of the album. There is, however, a problem that an album created by simply pasting photographic image data thereinto might look bare. In order to make an album look gorgeous, a user is required to edit and process the album. Such work requires a lot of time and trouble.

In the above-described known technique, image data is pasted to a template image on a paper sheet, and then the paper sheet is printed. Ordered printed matter resulting simply from pasting photographic image data to a template image might not necessarily look sufficiently gorgeous. The above-described problem, therefore, could not be solved sufficiently.

SUMMARY

An information processing apparatus according to the present disclosure includes a storage medium, an input device, and a processor. The storage medium stores a plurality of pieces of photograph data and a plurality of comments. The input device accepts a selection of, from among the plurality of pieces of photograph data stored by the storage medium, a set of pieces of photograph data to be included in album page data used for printing of an album. The processor places the set of pieces of photograph data selected at the input device in the album page data. The processor adds an enclosure image to each of the set of pieces of photograph data in the album page data. The processor selects, from among the plurality of comments stored by the storage medium, a comment to be added to the each of the set of pieces of photograph data. The processor performs control so that the comment thus selected is included in the enclosure image, thus adding the comment to the each of the set of pieces of photograph data.

Furthermore, a method for controlling an information processing apparatus according to the present disclosure includes steps of storing a plurality of pieces of photograph data and a plurality of comments, accepting a selection of, from among the plurality of pieces of photograph data stored, a set of pieces of photograph data to be included in album page data used for printing of an album, placing the set of pieces of photograph data selected in the album page data, adding an enclosure image to each of the set of pieces of photograph data in the album page data, selecting, from among the plurality of comments stored, a comment to be added to the each of the set of pieces of photograph data, and including the comment thus selected in the enclosure image, thus adding the comment to the each of the set of pieces of photograph data.

Further features and advantages of the present disclosure will be made more apparent from an embodiment described below.

BRIEF DESCRIPTION OF THE DRAWINGS

FIG. 4 is a view showing one example of performing basic setting of album page data in the information processing apparatus according to the embodiment.

FIG. 5 is a view showing one example of placing photograph data in the album page data in the information processing apparatus according to the embodiment.

FIG. 8 is a view showing one example of the comments according to the embodiment.

FIG. 9 is a view showing one example of editing the album page data according to the embodiment.

DETAILED DESCRIPTION

The present disclosure is to automatically add a comment to a photograph, thus allowing a fun and gorgeous album to be obtained without requiring a user's trouble of performing editing. With reference to FIG. 1 to FIG. 9, the following describes an information processing apparatus 100 according to an embodiment of the present disclosure. Furthermore, the following description is directed to a case where a PC (a computer) is used as the information processing apparatus 100. The information processing apparatus 100 may be an image forming apparatus such as a multifunctional peripheral. Various elements such as configurations and arrangements included in the description of this embodiment do not limit the scope of the disclosure and are merely illustrative examples. Furthermore, in the following, photographic image data (a photographic image file) is referred to as photograph data 8. For example, image data is a file in a JPEG or RAW format.

(Information Processing Apparatus 100)

Figure 1:
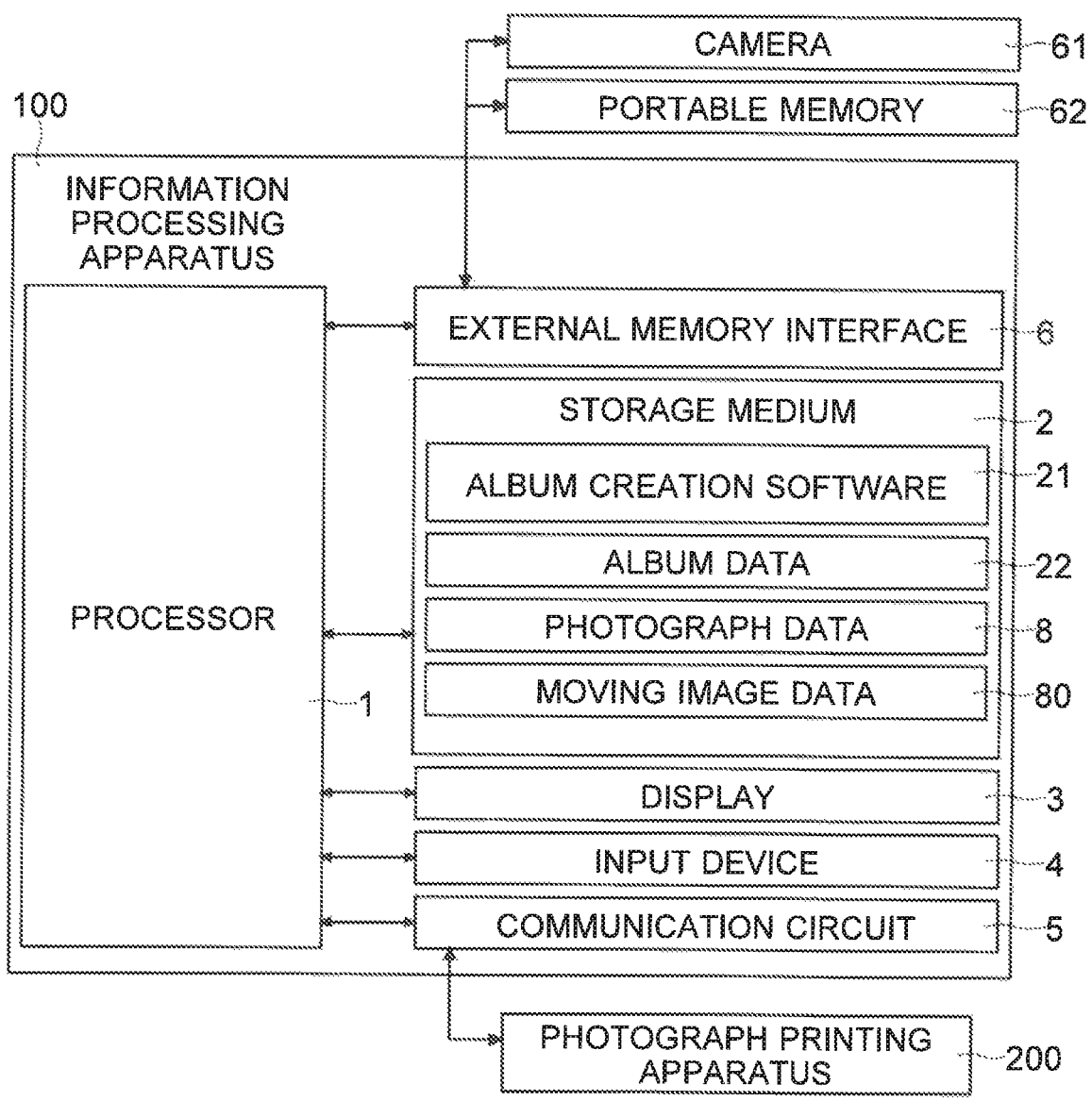
FIG. 1 is a view showing one example of an information processing apparatus according to an embodiment.

With reference to FIG. 1, a description is given of one example of the information processing apparatus 100 according to the embodiment. The information processing apparatus 100 includes a processor 1, a storage medium 2, a display 3, an input device 4, a communication circuit 5, and an external memory interface 6.

The processor 1 is an electronic circuit board including a plurality of circuits and devices. The processor 1 includes, for example, a CPU and an image processing circuit. The storage medium 2 stores an OS, data, programs, and various types of software in a non-volatile manner. The storage medium 2 includes a flash ROM, an HDD, and a RAM. Based on the OS, data, programs, and various types of software, the processor 1 controls operations of the information processing apparatus 100. In accordance with contents stored in the storage medium 2, the processor 1 controls various portions of the information processing apparatus 100.

The processor 1 controls the display 3 to display a screen and information. The display 3 includes, for example, a liquid crystal panel or an organic EL panel. The input device 4 accepts an operation performed by a user. The input device 4 is, for example, a keyboard or a mouse. The input device 4 may be a touch panel. Based on an output of the input device 4, the processor 1 recognizes contents of the operation performed.

The communication circuit 5 includes a communication control circuit and a communication memory. The communication memory stores communication software. In accordance with an instruction from the processor 1, the communication circuit 5 communicates with a photograph printing apparatus 200. Based on album page data 7, the photograph printing apparatus 200 prints an album. The photograph printing apparatus 200 is, for example, a printer or a multifunctional peripheral.

Album creation software 21 is installed onto the storage medium 2 of the information processing apparatus 100. Based on the album creation software 21, the information processing apparatus 100 generates album data 22. The album data 22 includes one or a plurality of pages of album page data 7. One page of album data 22 corresponds to one piece of album page data 7. A plurality of pieces of photograph data 8 are placed in each piece of album page data 7. The processor 1 controls the communication circuit 5 to transmit the album data 22 toward the photograph printing apparatus 200. Based on the album data 22 received, the photograph printing apparatus 200 prints an album.

The external memory interface 6 is an interface for connecting a camera 61 and a portable memory 62 to the information processing apparatus 100. The camera 61 and the portable memory 62 each store photographic image data (the photograph data 8, a photograph file). The input device 4 accepts a selection of, from among pieces of photograph data 8 stored in the camera 61 or the portable memory 62, a piece of photograph data 8 to be transferred. The processor 1 reads the piece of photograph data 8 thus selected. The processor 1 controls the storage medium 2 to store the piece of photograph data 8 thus read in a non-volatile manner. In this manner, the storage medium 2 stores the photograph data 8.

(Creation of Album Data 22)

Figure 2:
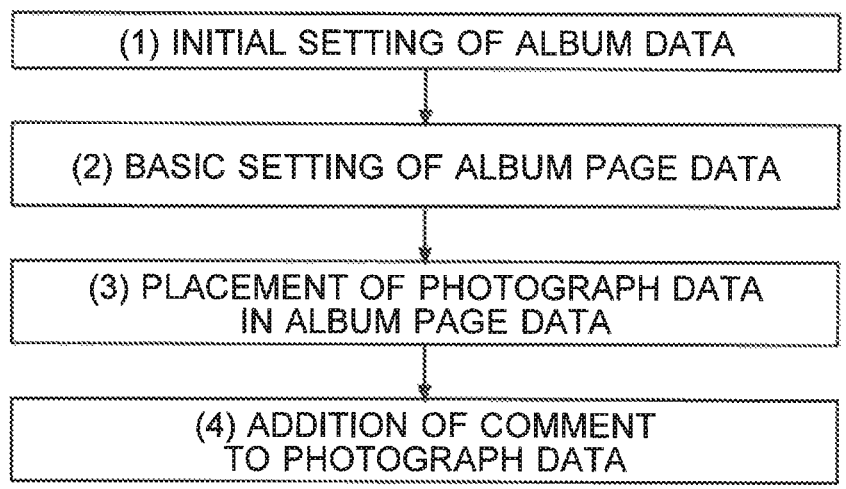
FIG. 2 is a view showing one example of a basic flow of creating album data in the information processing apparatus according to the embodiment.

Next, with reference to FIG. 2, a description is given of one example of a flow of creating an album (the album data 22) in the information processing apparatus 100 according to the embodiment. A creator of an album starts the album creation software 21 in the information processing apparatus 100. The creator can create the album data 22 by using the information processing apparatus 100. A process of creating the album data 22 undergoes, for example, steps described below.

For example, the flow follows steps of (1) initial setting of the album data 22→(2) basic setting of the album page data 7→(3) placement of the photograph data 8 in the album page data 7→(4) addition of a comment 9 to the photograph data 8. The following describes each of these steps.

(Initial Setting of Album Data 22)

Figure 3:
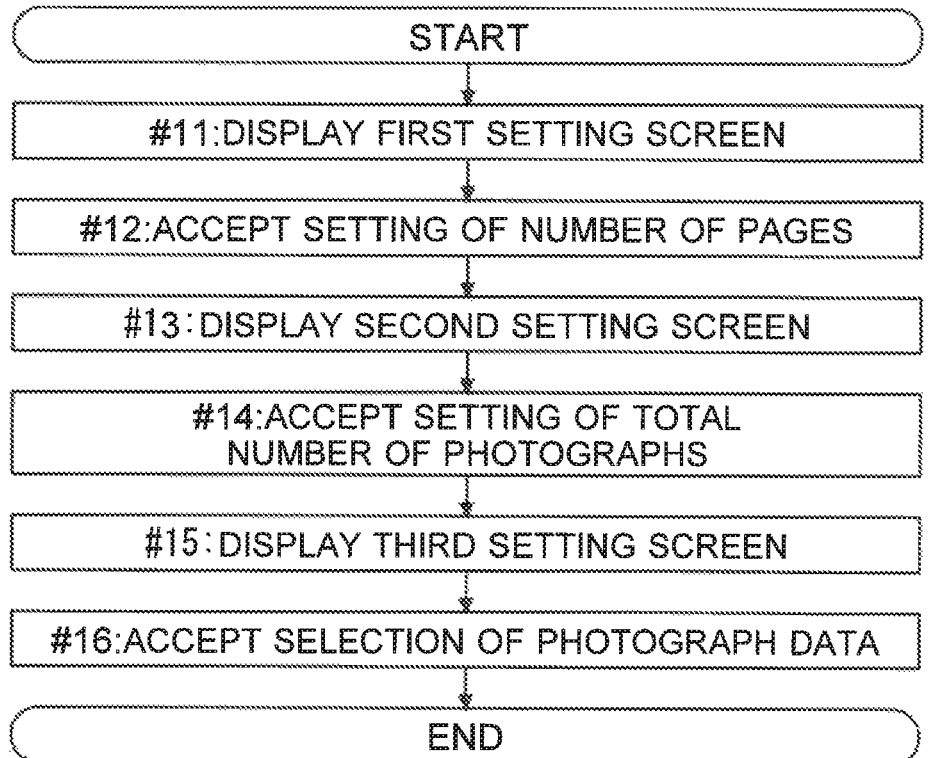
FIG. 3 is a view showing one example of performing setting of the album data by using the information processing apparatus according to the embodiment.

Next, with reference to FIG. 3, a description is given of one example of performing setting of the album data 22 by using the information processing apparatus 100 according to the embodiment. The input device 4 accepts starting of the album creation software 21. The processor 1 starts the album creation software 21. In FIG. 3, "START" refers to a point in time when the processor 1 starts the album creation software 21.

The processor 1 first controls the display 3 to display a first setting screen for setting the number of pages of the album data 22 (pieces of album page data 7) to be created (step #11). The input device 4 accepts setting of the number of pages of the album data 22 (the number of the pieces of album page data 7) (step #12). After the setting of the number of pages has been performed, the processor 1 controls the display 3 to display a second setting screen for setting a total number of photographs (pieces of photograph data 8) to be included in the album data 22. The input device 4 accepts setting of the total number (step #14).

Next, the processor 1 controls the display 3 to display a third setting screen for selecting pieces of photograph data 8 to be included in the album data 22 (the album page data 7) (step #15). For example, the processor 1 controls the display 3 to display a list screen showing a list of pieces of photograph data 8 (an image file) stored by the storage medium 2. The processor 1 extracts, as the pieces of photograph data 8, a file of image data from among files stored by the storage medium 2. The processor 1 reduces the pieces of photograph data 8 thus extracted so as to generate their thumbnail images. The processor 1 performs control so that the thumbnail images thus generated are displayed in the list screen. An album creator selects thumbnail images from among them by using the input device 4. The input device 4 accepts the selection of the thumbnail images. The input device 4 accepts the selection of the thumbnail mages as a selection of the pieces of photograph data 8 to be included in the album data 22 (the album page data 7) (step #16). A maximum selectable number of pieces of photograph data 8 corresponds to the total number that has been set. This completes initial setting related to creation of the album data 22 (END).

(Basic Setting of Album Page Data 7)

Next, with reference to FIG. 4, a description is given of one example of performing basic setting of the album page data 7 in the information processing apparatus 100 according to the embodiment. In FIG. 4, "START" refers to a point in time when the initial setting of the album data 22 is completed (a point in time when the flow chart of FIG. 3 is ended). First, based on the initial setting, the processor 1 generates the album page data 7. Specifically, the processor 1 generates the same number of pieces of album page data 7 as the number of pages that has been set (step #21). When the number of pages of the album data 22 is five, the processor 1 generates five pages of album page data 7.

Next, the processor 1 determines the number of pieces of photograph data 8 to be placed in each piece of album page data 7 (step #22). This completes the basic setting of the album page data 7 (END). Based on the total number of pieces of photograph data 8 set in the initial setting, the processor 1 determines the number of pieces of photograph data 8 to be included in each piece of album page data 7. For example, the processor 1 determines the number of pieces of photograph data 8 to be included in each piece of album page data 7 by dividing the total number of pieces of photograph data 8 by the number of pages of the album page data 7. For example, when the total number of pieces of photograph data 8 is 20 and the number of pages of the album data 22 is five, the processor 1 determines that the number of pieces of photograph data 8 to be included in each page is four (20/5). When there is a remainder of dividing the total number of pieces of photograph data 8 by the number of pages of the album data 22, the processor 1 selects the same number of pieces of album page data 7 as the remainder. The number of pieces of photograph data 8 to be included in each selected piece of album page data 7 is set to a number obtained by adding one to an integer resulting from the division. The processor 1 sets the number of pieces of photograph data 8 to be included in each unselected piece of album page data 7 to the same number as the integer resulting from the division.

(Placement of Photograph Data 8 in Album Page Data 7)

Next, with reference to FIG. 5, a description is given of one example of placing the photograph data 8 in the album page data 7 in the information processing apparatus 100 according to the embodiment. First, a basic layout of the photograph data 8 in each page is predetermined. Placement positions of pieces of photograph data 8 to be placed in each page depend on the number of the pieces of photograph data 8. For example, when four pieces of photograph data 8 are to be placed in a piece of album page data 7, the processor 1 places the pieces of photograph data 8 in two columns by two rows in a page corresponding thereto. Furthermore, for example, when two pieces of photograph data 8 are to be placed in a piece of album page data 7, the processor 1 places the pieces of photograph data 8 in one column or in one row in a page corresponding thereto. Furthermore, for example, when three pieces of photograph data 8 are to be placed in a piece of album page data 7, the processor 1 places the pieces of photograph data 8 in a V-shape. When there are a plurality of pages of album page data 7, the processor 1 places the photograph data 8 therein, starting from a first one of the pages.

In FIG. 5, "START" refers to a point in time when the basic setting of the album page data 7 is completed (the flow chart of FIG. 4 is completed). First, the processor 1 performs a process for determining persons shown respectively in pieces of photograph data 8 selected in the initial setting (on the third setting screen) (pieces of photograph data 8 selected by a creator) and in each unselected piece of photograph data 8 stored in the storage medium 2 (step #31). For example, for every piece of photograph data 8 stored in the storage medium 2, the processor 1 determines each person shown therein.

In the process for person determination, for each piece of photograph data 8, the processor 1 detects a face image, cuts out the face image, and generates feature data. First, for each of pieces of photograph data 8 (pieces of photograph data 8 selected by a creator and each unselected piece of photograph data 8), the processor 1 detects a face image. For example, the processor 1 may detect the face image by pattern matching with a standard face image previously stored in the storage medium 2. Furthermore, the processor 1 may detect the face image based on recognition of a skin color pixel region in each of the pieces of photograph data 8. In this case, the processor 1 may recognize, as the face image, a pixel region of a skin color including a color indicating a facial part (organ) in the skin color pixel region. The facial part refers to, for example, eyes, a nose, a mouth, eyebrows, or ears.

The processor 1 cuts out the recognized face images from the pieces of photograph data 8 in which the face images have been detected, respectively. The processor 1 extracts features of the face images thus cut out. For each of the face images (for each of the pieces of photograph data 8), the processor 1 generates feature data. Based on each of the face images, the processor 1 generates, as the feature data, a numerical value indicating a relative positional relationship among facial parts. Furthermore, the processor 1 may generate, as the feature data, a numerical value indicating a shape of a facial site (part) such as a contour of eyes, a nose, jaws, or a face. Furthermore, the processor 1 may generate, as the feature data, a numerical value indicating a position of a wrinkle, a length of a wrinkle, or the number of wrinkles. In a case where any of the pieces of the photograph data 8 includes a plurality of face images, the processor 1 generates feature data for each of the face images.

Next, the processor 1 checks whether or not the number of pieces of photograph data 8 selected in the initial setting (on the third setting screen) is less than the total number of pieces of photograph data 8 set in the initial setting (step #32). When the number of pieces of photograph data 8 selected on the third setting screen is lower and thus a "Yes" results at step #32, the processor 1 automatically selects a piece of photograph data 8 (step #33). The processor 1 automatically selects a piece of photograph data 8 until a sum of the number of pieces of photograph data 8 selected in the initial setting and the number of pieces of photograph data 8 thus automatically selected becomes equal to the total number. The processor 1 automatically selects an unselected piece of photograph data 8 stored in the storage medium 2. When wishing to avoid an automatic selection of a piece of photograph data 8, an album creator could select the same number of pieces of photograph data 8 as the set total number by using the input device 4.

A technique for automatically selecting a piece of photograph data 8 is predetermined. The processor 1 may automatically select a piece of photograph data 8 showing the same person as in pieces of photograph data 8 selected by an album creator. In this case, the processor 1 may automatically select an unselected piece of photograph data 8 stored in the storage medium 2, which includes a face image and has an absolute value of a difference in feature data from the pieces of photograph data 8 selected by the creator equal to or less than a permissible value. In a case where there is no piece of photograph data 8 having an absolute value of the difference equal to or less than the permissible value, the processor 1 determines that there is no piece of photograph data 8 showing the same person as in the pieces of photograph data 8 selected by the creator.

Furthermore, the processor 1 may automatically select, from among unselected pieces of photograph data 8, a piece of photograph data 8 in such a relationship that a face of a person shown therein faces a face of a person shown in any piece of photograph data 8 selected by an album creator. In this case, the processor 1 determines an orientation of a face of a person shown in each piece of photograph data 8. For example, for each person (face image), the processor 1 determines an orientation of a face based on an iris direction, a contour of the face, or a shape of jaws. For example, when a face of the person shown in any piece of photograph data 8 selected by the album creator faces rightward, the processor 1 may automatically select a piece of photograph data 8 showing a person whose face faces leftward.

Furthermore, the processor 1 may check metadata attached to the photograph data 8 stored in the storage medium 2. Metadata may be attached to the photograph data 8 (a photograph file). There is known Exif as a standard file format for the metadata attached to the photograph data 8. Information including a date and time of photography, a name of a manufacturer of the camera 61, a model name of the camera 61, and so on is attached to the Exif-based metadata for the photograph data 8.

The processor 1 checks the metadata for the photograph data 8 stored in the storage medium 2. Further, the processor 1 may automatically select, from among unselected pieces of photograph data 8, a piece of photograph data 8 that has the same month and day of photography as and a different year of photography from selected pieces of photograph data 8 (pieces of photograph data 8 selected by a creator and each piece of photograph data 8 automatically selected by the processor 1). This is from a viewpoint that an event such as a birthday party may take place every year. Furthermore, the processor 1 may extract a piece of photograph data 8 that has, while having a different year of photography, a month and day of photography that is the same as or different from that of the selected pieces of photograph data 8 by a number of days within a permissible range. The permissible range is predetermined. For example, the permissible range may be a range of plus seven days to minus seven days with respect to a month and day of photography of the selected piece of photograph data 8.

Furthermore, in a case of an automatic selection, the processor 1 may automatically select a piece of photograph data 8 only from the same folder as a folder containing pieces of photograph data 8 selected by a creator.

When a "No" results at step #32 or after the process step at step #33, the processor 1 sequentially places selected pieces of photograph data 8 in the album page data 7. First, when a plurality of pieces of photograph data 8 each showing a person have been selected, the processor 1 places, in a piece of album page data 7, the pieces of photograph data 8 each showing a person in lateral arrangement (step #34).

At this time, the processor 1 may place, in the piece of album page data 7, two photographs, namely two pieces of photograph data 8, so that faces of persons shown respectively in the two photographs face each other. In this case, for each piece of photograph data 8, the processor 1 determines an orientation of a face of a person. For example, for each person (face image), the processor 1 determines an orientation of a face based on an iris direction, a contour of the face, or a shape of jaws. In a case where there are two pieces of photograph data 8 respectively showing faces facing each other, the processor 1 places, in a piece of album page data 7, said two pieces of photograph data 8 so that they laterally adjoin each other. In a case where there is no piece of photograph data 8 showing a person, the processor 1 could skip step #34.

Next, the processor 1 extracts, from among selected pieces of photograph data 8 yet to be placed, a plurality of pieces of photograph data 8 that each have the same month and day of photography and a different year of photography or a plurality of pieces of photograph data 8 that each have, while having a different year of photography, a month and day of photography that is the same as or different from that of the selected pieces of photograph data 8 by a number of days within a permissible range (step #35). Further, the processor 1 places, in the album page data 7, the extracted pieces of photograph data 8 so that they are arranged in chronological order of date of photography (step #36).

Next, the processor 1 places, in blank space remaining unused, selected pieces of photograph data 8 yet to be placed (step #37). For example, the processor 1 sequentially places the pieces of photograph data 8 therein, starting from a first one of pieces of album page data 7, in chronological order of date of photography. In other words, the processor 1 sequentially pastes the pieces of photograph data 8 in order, starting from a first one of pieces of album page data 7 each having blank space. Eventually, the processor 1 pastes each of all selected pieces of photograph data 8 to any one of the pieces of album page data 7 (END).

(Addition of Comment 9 to Photograph Data 8)

Figure 6:
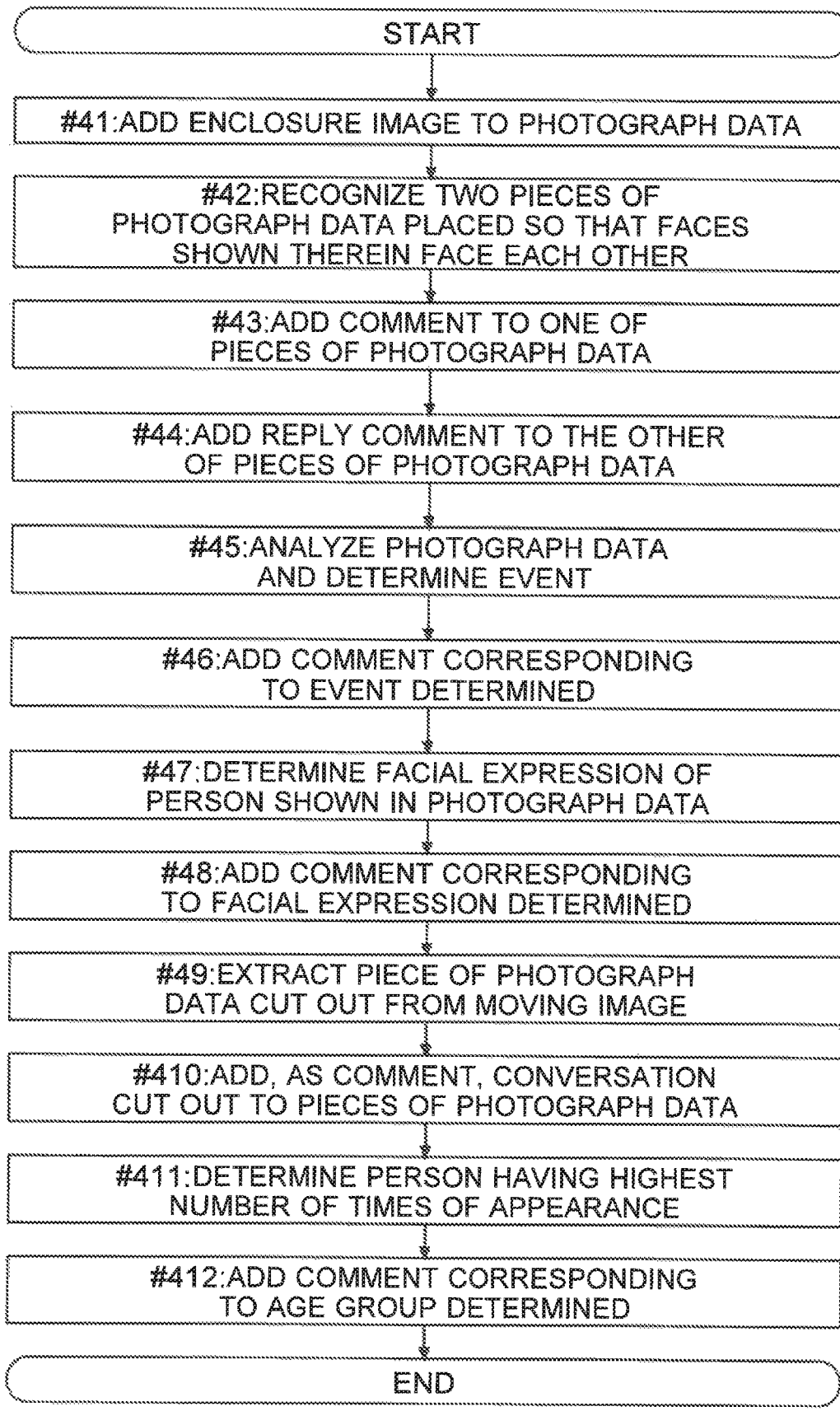
FIG. 6 is a view showing one example of adding comments to the photograph data in the information processing apparatus according to the embodiment.
Figure 7:
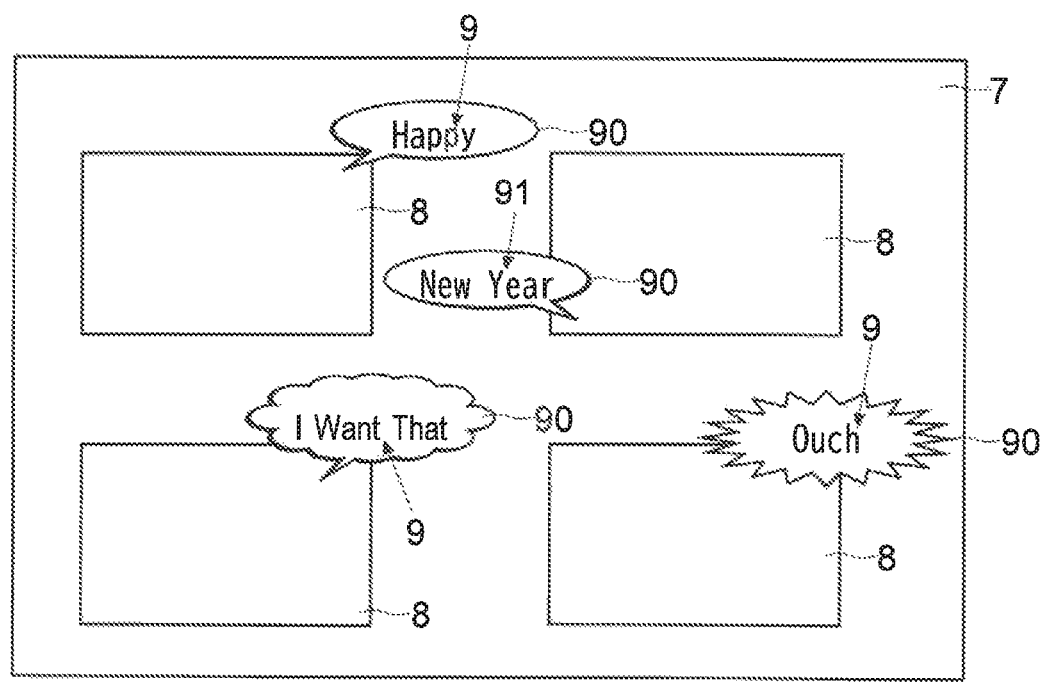
FIG. 7 shows one example of the album page data to which the comments have been added according to the embodiment.

Next, with reference to FIG. 6 to FIG. 8, a description is given of one example of adding the comment 9 to the photograph data 8 in the information processing apparatus 100 according to the embodiment. In FIG. 6, "START" refers to a point in time when pasting of selected pieces of photograph data 8 to the album page data 7 is completed. In other words, this refers to a point in time when the flow chart of FIG. 5 is ended.

First, as shown in FIG. 7, the processor 1 adds an enclosure image 90 to each piece of photograph data 8 in a piece of album page data 7 (step #41).

The enclosure image 90 is a frame for containing the comment 9. The comment 9 will be detailed later. As shown in FIG. 7, the enclosure image 90 may have a speech balloon shape. Being in a speech balloon shape, the enclosure image 90 can be viewed as if a conversation is taking place. Furthermore, such a speech balloon shape is not limited to one type. The processor 1 may paste enclosure images 90 having different speech balloon shapes on each piece of photo data 8.

Furthermore, the enclosure image 90 is not limited to a speech balloon shape. The enclosure image 90 may have an elliptical shape or a rectangular shape. The input device 4 may accept setting of a shape of the enclosure image 90. In this case, the processor 1 adds the enclosure image 90 having the shape thus set to the photograph data 8.

The processor 1 adds the enclosure image 90 to each of all pieces of photograph data 8 in the album page data 7. The input device 4 may accept a selection of a piece of photograph data 8 to which the enclosure image 90 is not to be added. In this case, the processor 1 does not add the enclosure image 90 to the thus selected piece of photograph data 8. The comment 9 is also not added to the piece of photograph data 8 to which the enclosure image 90 is not added.

Here, the storage medium 2 stores a plurality of comments 9. FIG. 8 shows one example of the comments 9 stored by the storage medium 2. The storage medium 2 stores the comments 9 so that they correspond to age groups, respectively. In other words, the comments 9 are classified by age groups. For example, first to fourth age groups are set as the age groups. For example, it is possible to set infants (zero years old to under six years old) as the first age group, children (six years old to under 18 years old) as the second age group, adults (18 years old to under 60 years old) as the third age group, and elderly people (60 years old or older) as the fourth age group. These are strictly one example, and the number of age groups may be four or more.

The storage medium 2 stores about several tens to several hundreds of comments 9 for each of the age groups. The input device 4 may accept the comment 9 to be added to the storage medium 2. In this case, the processor 1 controls the storage medium 2 to additionally store the comment 9 thus inputted to be added thereto.

Furthermore, the storage medium 2 may store the comments 9 so that they correspond to events, respectively. For example, it is possible to store the comments 9 so that they correspond to events such as a birthday, Christmas, and New Year's Day.

Furthermore, the storage medium 2 may store the comments 9 so that they correspond to facial expressions, respectively. For example, it is possible to store the comments 9 so that they correspond to facial expressions indicating that "it hurts," "I am smiling," and "I am crying."

Furthermore, reply comments 91 can be defined so as to correspond to the comments 9, respectively. The storage medium 2 stores the reply comments 91 that are replies to the comments 9, respectively. Preferably, each of the reply comments 91 is defined so as to form a conversation together with a corresponding one of the comments 9.

First, the processor 1 recognizes a combination of two photographs, namely two pieces of photograph data 8, placed so that faces of persons shown respectively in the two photographs face each other (step #42). Further, the processor 1 adds one of the comments 9 to one of the pieces of photograph data 8 respectively showing the faces facing each other (for example, a left-hand one of the pieces of photograph data 8) (step #43). At this time, the processor 1 adds, as the one of the comments 9, a comment corresponding to an age group determined and having a corresponding one of the reply comments 91 that have been set in a case where there are a plurality of comments 9 each corresponding to the age group determined and having a corresponding one of the reply comments 91 that have been set, the processor 1 adds any one of the plurality of comments 9. Based on a prescribed algorithm, the processor 1 selects any one of the comments 9 so as to look as if the any one of the comments 9 is selected in a random manner.

For example, based on age determination software, the processor 1 determines (estimates) an age group to which the person shown in the one of the pieces of photograph data 8 belongs. The age determination software is stored in the storage medium 2 in a non-volatile manner. For example, based on the age determination software, the processor 1 determines the age group to which the person shown in the one of the pieces of photograph data 8 belongs. The age determination software includes a discriminator (a discrimination algorithm). The processor 1 inputs, to the discriminator, a piece of feature data on the person shown in the one of the pieces of photograph data 8. Based on an output of the discriminator, the processor 1 determines the age group to which the person belongs. Learning of the discriminator (teaching of feature data and correct answers thereto) has been previously performed. Any other technique may be used to determine an age group to which a person belongs. For example, the processor 1 may determine that the higher the number of wrinkles of a person, the higher an age group to which the person belongs.

The processor 1 adds, to the other of the pieces of photograph data 8 respectively showing the faces facing each other, one of the reply comments 91 corresponding to the one of the comments 9 added to the one of the pieces of photograph data 8 (step #44). When there is no combination of two photographs, namely two pieces of photograph data 8, placed so that faces of persons shown respectively in the two photographs face each other, the processor 1 skips step #42 to step #44.

Next, the processor 1 analyzes each piece of photograph data 8 to which none of the comments 9 has been added yet and determines an event corresponding thereto (step #45). The determination of an event may be performed by, for example, pattern matching with an event determination image previously stored in the storage medium 2. For example, an event corresponding to the event determination image has been previously defined. For example, as the event determination image, an image of a candle is prepared. As an event corresponding to the image of a candle, a birthday is defined. Based on a candle shown in a piece of photograph data 8, the processor 1 determines the event corresponding to the piece of photograph data 8. Furthermore, as the event determination image, an image of a tent may be prepared. As an event corresponding to the image of a tent, camping is defined. Based on a tent shown in a background of a piece of photograph data 8, the event corresponding to the piece of photograph data 8 is determined.

The processor 1 adds, to each piece of photograph data 8 to which none of the comments 9 has been added and that has undergone the determination of an event corresponding thereto, one of the comments 9 corresponding to the event thus determined (step #46). The processor 1 is not required to ascertain events corresponding respectively to all pieces of photograph data 8 to which none of the comments 9 have been added. Only for each piece of photograph data 8 whose matching ratio with the event determination image is equal to or more than a prescribed value, the processor 1 adds one of the comments 9 corresponding to an event determined.

Next, the processor 1 analyzes each piece of photograph data 8 to which none of the comments 9 has been added and determines a facial expression of a person shown in the each piece of photograph data 8 (step #47). When a plurality of persons are shown in a piece of photograph data 8, a facial expression of one of the plurality of persons whose face image is the largest.

The processor 1 determines a facial expression indicating that, for example, "it hurts," "I am happy," "I am smiling," or "I am crying." The processor 1 may determine a facial expression by matching between a face image template and a face image detected. In this case, the storage medium 2 stores, in a non-volatile manner, a multitude of template face images corresponding to types of facial expressions, respectively. Alternatively, the processor 1 may determine a facial expression by using a technique referred to as "Fisher's Linear Discriminant Analysis."

The processor 1 adds, to each piece of photograph data 8 to which none of the comments 9 has been added and that has undergone the determination of a facial expression corresponding thereto, one of the comments 9 corresponding to the facial expression thus determined (step #48). The processor 1 is not required to ascertain facial expressions corresponding respectively to all pieces of photograph data 8 to which none of the comments 9 have been added. For each piece of photograph data 8 in which a facial expression is unclear or no person is shown, the processor 1 does not add any of the comments 9 at this step.

Next, the processor 1 extracts, from among pieces of photograph data 8 to which none of the comments 9 have been added, a piece of photograph data 8 that has been cut out from a moving image (step #49). Specifically, the processor 1 checks images included in moving image data 80 stored in the storage medium 2. The processor 1 checks whether or not the moving image data 80 includes any piece of photograph data 8 to which none of the comments 9 has been added. The processor 1 extracts, from among the pieces of photograph data 8 to which none of the comments 9 have been added, a piece of photograph data 8 agreeing with one of the images included in the moving image data 80.

The processor 1 cuts out a conversation from the moving image as a cut-out source from which the piece of photograph data 8 has been extracted, and adds, as the comment 9, the conversation thus cut out to the piece of photograph data 8 (step #410). Specifically, for a piece of photograph data 8 agreeing with one of images included in a moving image, the processor 1 recognizes a time in the moving image at which the same image as the piece of photograph data 8 is played back. From the moving image data 80, the processor 1 extracts voice data having a prescribed duration (for example, several seconds) centered at the time of playing back the image. The processor 1 performs voice recognition of the voice data thus extracted and converts it into a character string. The character string resulting from the conversion is used as the comment 9. For example, in a case of voice data for playing back a word "Congratulations," the processor 1 adds a character string "Congratulations" to the piece of photograph data 8 extracted from the moving image.

Next, the processor 1 determines, among persons shown in selected pieces of photograph data 8 (pieces of photograph data 8 selected by a creator and each piece of photograph data 8 automatically selected by the processor 1), a person having a highest number of times of appearance (step #411). The processor 1 performs this determination based on feature data of the selected pieces of photograph data 8. For example, for each piece of feature data, the processor 1 determines a total sum of numerical values indicating facial features. The processor 1 detects groups of pieces of feature data, each of which is a group of pieces of feature data that are the same in the total sum or different in the total sum from each other by a difference within a prescribed range. The processor 1 determines that a person corresponding to, among those groups, a group having a highest number of pieces of feature data is the person having a highest number of times of appearance. Next, based on the above-described age determination software and the pieces of feature data of a face image of the person having a highest number of times of appearance, the processor 1 determines (estimates) an age group to which the person having a highest number of times of appearance belongs.

There may be a case of creating an album for a particular person such as a child or a close friend. In such a case, an increased number of pieces of photograph data 8 showing the particular person are used in the album. For the person for whom the album is intended, an age group to which the person belongs is determined, and thus the comment 9 appropriate for the person can be added to each of the pieces of photograph data 8.

The processor 1 adds, one by one, one of the comments 9 stored by the storage medium 2, which corresponds to the age group determined, to each remaining piece of photograph data 8 to which none of the comments 9 has been added (step #412). When there are a plurality of remaining pieces of photograph data 8 to which none of the comments 9 have been added, the processor 1 adds, to the pieces of photograph data 8, different ones of the comments 9 from each other. The process of automatically adding the comments 9 to the photograph data 8 is ended (END).

Eventually, the processor 1 adds the comment 9 of some sort to each of all pieces of photograph data 8. In other words, the processor 1 adds the comment 9 to each piece of photograph data 8 included in the album data 22 (included in all pieces of album page data 7).

(Editing of Album Page Data 7)

Next, with reference to FIG. 9, a description is given of one example of editing the album page data 7 in the information processing apparatus 100 according to the embodiment. FIG. 9 is a view showing one example of editing the album page data 7 according to the embodiment.

Upon ending of the automatic addition of the comment 9, the processor 1 controls the display 3 to display the album page data 7 with the comments 9 added thereto. In other words, the processor 1 controls the display 3 to display a preview screen of the album page data 7.

As shown in FIG. 9, the input device 4 accepts designation of one of the comments 9 (the enclosure images 90) to be modified. For example, an album creator designates one of the enclosure images 90 (the comments 9) by using a mouse. Further, the input device 4 accepts an operation of modifying the one of the comments 9 thus designated. For example, the album creator inputs the comment 9 by using a keyboard. Upon the input device 4 accepting such a modifying operation, the processor 1 modifies (changes) the designated one of the comments 9. In this manner, any improper one of the comments 9 automatically added can be modified by an album creator (see FIG. 9).

Furthermore, the input device 4 accepts an operation of adding the enclosure image 90 to the album page data 7 and an operation of setting the comment 9 to be included in the enclosure image 90 thus added. That is, the enclosure image 90 and the comment 9 can be added by an album creator. The processor 1 performs control so that the comment 9 set by the setting operation is included in the enclosure image 90 added by the adding operation.

Furthermore, the input device 4 accepts an operation of deleting the enclosure image 90 (the comment 9). When unnecessary, the comment 9 and the enclosure image 90 can be deleted by an album creator. The processor 1 deletes, from the album page data 7 (the album data 22), the enclosure image 90 intended by the deleting operation.

Modification, addition, and deletion of the comment 9 may be able to be performed by voice input.

The input device 4 accepts an operation of saving the album data 22 created. Upon the saving operation being performed, the processor 1 controls the storage medium 2 to store the album data 22 in a non-volatile manner. Furthermore, the input device 4 accepts an operation of printing the album data 22 created. The processor 1 transmits the album data 22 intended by the printing operation to the photograph printing apparatus 200. The processor 1 controls the photograph printing apparatus 200 to perform printing based on the album data 22.

As discussed above, the information processing apparatus 100 according to the embodiment includes the storage medium 2, the input device 4, and the processor 1. The storage medium 2 stores a plurality of pieces of photograph data 8 and a plurality of comments 9. The input device 4 accepts a selection of, from among the plurality of pieces of photograph data 8 stored by the storage medium 2, a set of pieces of photograph data 8 to be included in the album page data 7 used for printing of an album. The processor 1 places the set of pieces of photograph data 8 selected at the input device 4 in the album page data 7. The processor 1 adds the enclosure image 90 to each of the set of pieces of photograph data 8 in the album page data 7. The processor 1 selects, from among the plurality of comments 9 stored by the storage medium 2, the comment 9 to be added to the each of the set of pieces of photograph data 8. The processor 1 performs control so that the comment 9 thus selected is included in the enclosure image 90, thus adding the comment 9 to the each of the set of pieces of photograph data 8.

The comment 9 and the enclosure image 90 are automatically added to each of the set of pieces of photograph data 8 placed in the album page data 7. It is possible to automatically add the comment 9 to the photograph data 8. There is no need for time and effort (data editing by a user) in adding the comment 9. Based on the album page data 7 automatically generated, a fun and gorgeous album can be printed.

The input device 4 accepts a total number of pieces of photograph data 8 to be included in the album page data 7. In a case where the number of the set of pieces of photograph data 8 selected at the input device 4 is less than the total number, the processor 1 automatically selects a piece of photograph data 8. When automatically selecting the piece of photograph data 8, the processor 1 selects, from among unselected pieces of photograph data 8, a piece of photograph data 8 showing a person whose face faces a face of a person shown in any one of the set of pieces of photograph data 8 selected via the input device 4. It is possible to automatically generate the album page data 7 in which pieces of photograph data 8 are arranged so that faces shown respectively therein face each other. The album page data 7 in which photographs highly relevant to each other are closely placed is automatically generated.

The storage medium 2 stores the reply comments 91 that are replies to the plurality of comments 9, respectively. The processor 1 places, in the album page data 7, two photographs, namely two pieces of photograph data 8, side by side so that faces of persons shown respectively in the two photographs face each other. The processor 1 adds the comment 9 to one of the two pieces of photograph data 8 respectively showing the faces facing each other. One of the reply comments 91 corresponding to the comment 9 added to the one of the two pieces of photograph data 8 respectively showing the faces facing each other is added to the other of the two pieces of photograph data 8. The comment 9 that can be viewed as if a conversation is taking place can be added to the photograph data 8. It is possible to automatically generate the album page data 7 in which pieces of photograph data 8 are placed so as to look as if a conversation is taking place.

Based on metadata attached to the photograph data 8, the processor 1 recognizes a date of photography of each of the plurality of pieces of photograph data 8. When automatically selecting the piece of photograph data 8, the processor 1 extracts pieces of photograph data 8 that each have the same month and day of photography as and a different year of photography from the selected set of pieces of photograph data 8 (the set of pieces of photograph data 8 selected by a creator and each piece of photograph data 8 automatically selected by the processor 1) or pieces of photograph data 8 that each have, while having a different year of photography, a month and day of photography that is the same as or different from that of the selected set of pieces of photograph data 8 by a number of days within a permissible range. The processor 1 places, in the album page data 7, the extracted pieces of photograph data 8 so that they are placed in chronological order of date of photography. By arranging pieces of photograph data 8 photographed annually on the same date or a date close to that date, it is possible to automatically generate the album page data 7 tracking a growth record or an annual change.

The storage medium 2 stores the plurality of comments 9 so that they correspond to age groups, respectively. The processor 1 determines one of the age groups to which a person belongs, the person having a highest number of times of appearance among persons shown in the set of pieces of photograph data 8 to be included in the album page data 7. The processor 1 adds one of the plurality of comments 9 corresponding to the one of the age groups thus determined to any of the set of pieces of photograph data 8. In a case of creating an album for a particular person, an increased number of pieces of photograph data 8 showing the particular person are used in the album. The particular person appears an increased number of times. It is possible to add, to each piece of photograph data 8, the comment 9 age-appropriate for a subject for whom an album is intended (a particular individual).

The storage medium 2 stores the plurality of comments 9 so that they correspond to events, respectively. The processor 1 determines one of the events corresponding to the set of pieces of photograph data 8 to be included in the album page data 7. The processor 1 adds one of the plurality of comments 9 corresponding to the one of the events thus determined to any of the set of pieces of photograph data 8. It is possible to add, to each piece of photograph data 8, the comment 9 appropriate to an event such as a birthday party. The comment 9 suitable for contents of each piece of photograph data 8 can be added.

The storage medium 2 stores the plurality of comments 9 so that they correspond to facial expressions, respectively. The processor 1 determines one of the facial expressions agreeing with a facial expression of a person shown in the set of pieces of photograph data 8 to be included in the album page data 7. The processor 1 adds one of the plurality of comments 9 corresponding to the one of the facial expressions thus determined to any of the set of pieces of photograph data 8. It is possible to add, to each piece of photograph data 8, the comment 9 appropriate to a facial expression of a person shown in the photograph.

The processor 1 extracts, from among the set of pieces of photograph data 8 to be included in the album page data 7, a piece of photograph data 8 that has been cut out from a moving image. The processor 1 cuts out a conversation from the moving image as a cut-out source from which the piece of photograph data 8 has been extracted and adds, as the comment 9, the conversation thus cut out to the piece of photograph data 8. Based on a moving image, it is possible to add, to a piece of photograph data 8, the comment 9 reproducing a conversation made at the time of taking the photograph.

The information processing apparatus 100 includes the input device 4 that accepts an operation. The input device 4 accepts an operation of modifying the comment 9. Upon the input device 4 accepting the modifying operation, the processor 1 modifies the comment 9 intended by the modifying operation. It is possible to add, to each piece of photograph data 8, the comment 9 suitable for a person shown in the photograph.

The input device 4 accepts an operation of adding the enclosure image 90 to the album page data 7 and an operation of setting the comment 9 to be included in the enclosure image 90 thus added. The processor 1 performs control so that the comment 9 set by the setting operation is included in the enclosure image 90 added by the adding operation. The comment 9 automatically inserted can be modified. It is possible to modify the comment 9 inappropriate for a photograph or the comment 9 that does not meet an album creator's intention.

The foregoing has described the embodiment of the present disclosure. The scope of the present disclosure, however, is not limited thereto. The present disclosure can be implemented by adding various modifications thereto without departing from the spirit of the disclosure.

The foregoing description of the embodiment is directed to an example in which the photograph data 9 is placed in (pasted to) the album page data 7. Upon the input device 4 accepting an instruction to create an album to which separately printed photographs are attached, the processor 1 may create the album data 22 including the album page data 7 in which space for attaching the photographs is indicated by a broken line. In this case, the processor 1 does not paste the photograph data 8 to the album page data 7. Since part of the enclosure image 90 might be hidden by any of the photographs attached, the processor 1 does not add the enclosure image 90 and the comment 9 thereto.

The present disclosure is applicable to information processing apparatuses.

What is claimed is:

1. An information processing apparatus, comprising:
   a storage medium that stores a plurality of pieces of photograph data and a plurality of comments;
   an input device that accepts a selection of, from among the plurality of pieces of photograph data stored by the storage medium, a set of pieces of photograph data to be included in album page data used for printing of an album; and
   a processor that places the set of pieces of photograph data selected at the input device in the album page data, adds an enclosure image to each of the set of pieces of photograph data in the album page data, selects, from among the plurality of comments stored by the storage medium, a comment to be added to the each of the set of pieces of photograph data, and performs control so that the comment thus selected is included in the enclosure image, thus adding the comment to the each of the set of pieces of photograph data,
   wherein
   the input device accepts a total number of pieces of the photograph data to be included in the album page data,
   in a case where the number of the set of pieces of photograph data selected at the input device is less than the total number, the processor automatically selects a piece of the photograph data,
   when automatically selecting the piece of the photograph data, the processor selects, from among unselected pieces of the photograph data, a piece of photograph data showing a person whose face faces a face of a person shown in any one of the set of pieces of photograph data selected via the input device,
   the storage medium stores reply comments that are replies to the plurality of comments, respectively,
   the processor places, in the album page data, two pieces of the photograph data side by side so that the faces of the persons shown respectively in the two pieces of the photograph data face each other,
   the processor adds the comment to one of the two pieces of the photograph data respectively showing the faces facing each other, and
   the processor adds one of the reply comments corresponding to the comment added to the one of the two pieces of the photograph data respectively showing the faces facing each other to the other of the two pieces of the photograph data.

2. The information processing apparatus according to claim 1, wherein
   based on metadata attached to the photograph data, the processor recognizes a date of photography of each of the plurality of pieces of photograph data,
   when automatically selecting the piece of the photograph data, the processor extracts pieces of the photograph data that each have a same month and day of photography as and a different year of photography from the selected set of pieces of photograph data or pieces of the photograph data that each have, while having a different year of photography, a month and day of photography that is the same as or different from that of the selected set of pieces of photograph data by a number of days within a permissible range, and
   the processor places, in the album page data, the extracted pieces of the photograph data so that they are placed in chronological order of date of photography.

3. The information processing apparatus according to claim 1, wherein
   the storage medium stores the plurality of comments so that they correspond to age groups, respectively,
   the processor determines one of the age groups to which a person belongs, the person having a highest number of times of appearance among persons shown in the set of pieces of photograph data to be included in the album page data, and
   the processor adds one of the plurality of comments corresponding to the one of the age groups thus determined to any of the set of pieces of photograph data.

4. The information processing apparatus according to claim 1, wherein
   the storage medium stores the plurality of comments so that they correspond to events, respectively,
   the processor determines one of the events corresponding to the set of pieces of photograph data to be included in the album page data, and
   the processor adds one of the plurality of comments corresponding to the one of the events thus determined to any of the set of pieces of photograph data.

5. The information processing apparatus according to claim 1, wherein
   the storage medium stores the plurality of comments so that they correspond to facial expressions, respectively,
   the processor determines one of the facial expressions agreeing with a facial expression of a person shown in the set of pieces of photograph data to be included in the album page data, and
   the processor adds one of the plurality of comments corresponding to the one of the facial expressions thus determined to any of the set of pieces of photograph data.

6. The information processing apparatus according to claim 1, wherein
   the processor extracts, from among the set of pieces of photograph data to be included in the album page data, a piece of photograph data that has been cut out from a moving image, and
   the processor cuts out a conversation from the moving image as a cut-out source from which the piece of photograph data has been extracted and adds, as the comment, the conversation thus cut out to the piece of photograph data.

7. The information processing apparatus according to claim 1, wherein
the input device accepts an operation of modifying the comment, and
upon the input device accepting the modifying operation, the processor modifies the comment intended by the modifying operation.

8. The information processing apparatus according to claim 1, wherein
the input device accepts an operation of adding the enclosure image to the album page data and an operation of setting the comment to be included in the enclosure image thus added, and
the processor performs control so that the comment set by the setting operation is included in the enclosure image added by the adding operation.

9. A method for controlling an information processing apparatus, comprising steps of:
storing a plurality of pieces of photograph data and a plurality of comments;
accepting a selection of, from among the plurality of pieces of photograph data stored, a set of pieces of photograph data to be included in album page data used for printing of an album;
placing the set of pieces of photograph data selected in the album page data;
adding an enclosure image to each of the set of pieces of photograph data in the album page data;
selecting, from among the plurality of comments stored, a comment to be added to the each of the set of pieces of photograph data;
including the comment thus selected in the enclosure image, thus adding the comment to the each of the set of pieces of photograph data,
accepting a total number of pieces of the photograph data to be included in the album page data;
in a case where the number of the set of pieces of photograph data selected is less than the total number, automatically selecting a piece of the photograph data;
when automatically selecting the piece of the photograph data, selecting, from among unselected pieces of the photograph data, a piece of photograph data showing a person whose face faces a face of a person shown in any one of the set of pieces of photograph data selected to be included in the album page data;
storing reply comments that are replies to the plurality of comments, respectively;
placing, in the album page data, two pieces of the photograph data side by side so that the faces of the persons shown respectively in the two pieces of the photograph data face each other;
adding the comment to one of the two pieces of the photograph data respectively showing the faces facing each other; and
adding one of the reply comments corresponding to the comment added to the one of the two pieces of the photograph data respectively showing the faces facing each other to the other of the two pieces of the photograph data.

* * * * *